F. & L. FRAME.
TIRE ALARM.
APPLICATION FILED JULY 10, 1917.
1,255,732.
Patented Feb. 5, 1918.
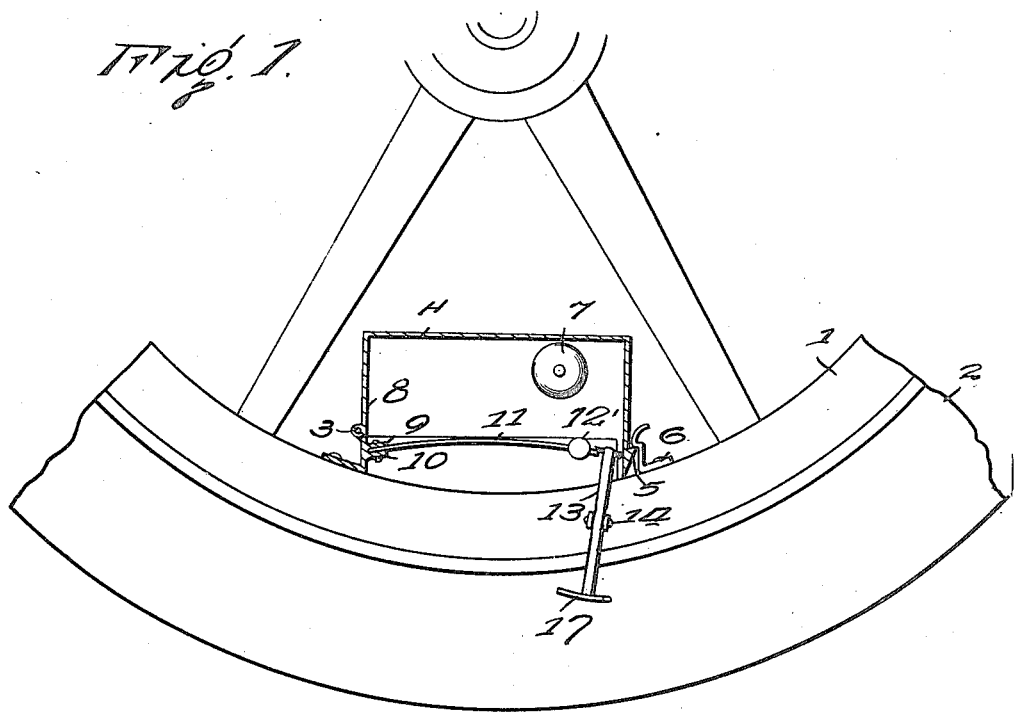
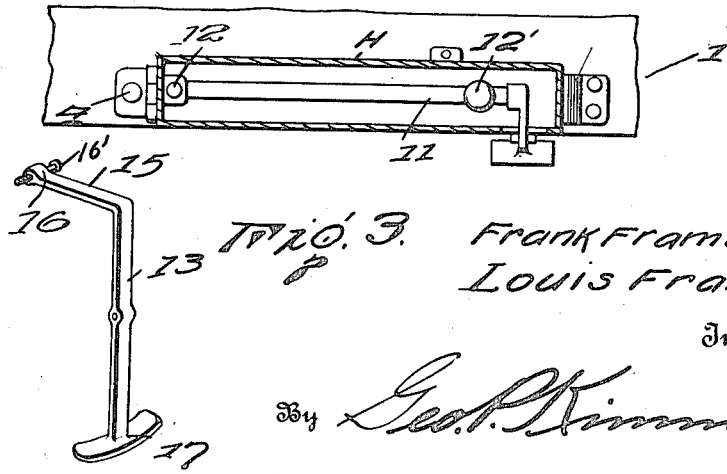
Frank Frame
Louis Frame
Inventor
By Geo. P. Kimmel
Attorney

UNITED STATES PATENT OFFICE.

FRANK FRAME AND LOUIS FRAME, OF SAWYER, KANSAS.

TIRE-ALARM.

1,255,732.	Specification of Letters Patent.	Patented Feb. 5, 1918.

Application filed July 10, 1917. Serial No. 179,692.

*To all whom it may concern:*

Be it known that we, FRANK FRAME and LOUIS FRAME, citizens of the United States, and residents of Sawyer, in the county of Pratt and State of Kansas, have invented certain new and useful Improvements in Tire-Alarms, of which the following is a specification.

This invention relates to deflation detectors and alarms for pneumatic tires.

It is the dominant object of our invention to devise and design a means for detecting and indicating deflation of a tire by means of a device adapted to be entirely mounted and carried by the wheel on which the tire is mounted; and also to provide a device which is substantially universally adapted to several sizes of wheels and which is interchangeable, simple and inexpensive, and easily and quickly applied without in any way whatsoever altering either the tire or wheel, or making any attachment to the vehicle body.

A still further object of our invention is to provide a device of the character mentioned which is not only adapted for use on the common form of wooden felly and spoke in general use but which may also be applied to the metallic rim and wire spoke wheels.

Other novel features of advantage and construction will more clearly hereinafter appear in the detailed description.

For the purpose of illustrating our invention, we have shown in the accompanying drawings one form thereof which is at present preferred by us, since the same will give in practice satisfactory and reliable results, although it is to be understood that the various instrumentalities to which our invention consists can be variously arranged and organized and that our invention is not limited to the precise arrangement and organization of these instrumentalities as herein shown and described.

In the accompanying drawing:

Figure 1 represents a side elevation of a vehicle with our invention applied, the housing therefor being shown in section;

Fig. 2 is a fragmentary top plan view thereof with the housing removed, and

Fig. 3 is a detailed perspective of the trip member.

Referring now more particularly to the drawings wherein similar characters of reference will designate corresponding parts throughout the several views 1 indicates the felly of a standard form of vehicle wheel having a pneumatic tire 2 associated therewith. A rectangular housing member designated H in its entirety is hingedly connected to the felly 1 by means of the hinge member 3 which is rigidly secured to the felly by means of the screw 4. The end opposite to that provided with the hinge member has an enlargement 5 thereon for a purpose which will hereinafter appear. A spring clip 6 is secured to the felly member which is adapted to releasably engage the enlargement 5. A resonant alarm member 7, preferably a gong, is rigidly secured to one of the side walls of the housing.

The end wall 8 of the housing member is provided with a pair of spaced apart extensions 9 and 10 adapted to receive the spring arm 11 which is rigidly secured therebetween by means of a pin 12. The hammer member 11 has a ball member 12' which is provided with a transversely extending slot therein to receive the spring arm which is adapted to at times engage the alarm 7 for an obvious purpose.

A trip member comprising an arm 13 is provided with an opening centrally thereof in an enlarged portion to receive a pin member 14 by means of which the same is swivelly connected to the felly. One end of the arm member is provided with a lateral extension 15 having an enlargement 16 thereon adapted to receive a set screw 16' to engage the portions of the hammer or spring member 11 which projects beyond the ball member. It is of course to be understood that the set screw 16' merely releasably engages the portions projecting beyond the ball. The opposite end of the arm member 13 is provided with a shoe 17 which upon the deflation of the tire causes the enlargement 16 to disengage the hammer member which of course will strike the gong giving the desired alarm.

When it is desired to reset the alarm member the casing is detachably removed by means of the clip member 6 and the alarm member reset.

From the foregoing description, the operation will be readily understood and it will be obvious that the invention is not to be restricted to the precise construction herein described, as the construction of the hammer member may be such that a continuous alarm may be made having the form of a train of gearing and spring generally used in alarm clocks.

Having thus fully described our invention, what we claim as new and desire to secure by Letters Patent, is:

1. The combination with a vehicle wheel and felly, of a housing hingedly connected thereto, a gong mounted within said housing, a hammer arm springingly mounted within the housing, and a trip arm swivelly connected to said felly adapted to at times engage said hammer for a purpose specified.

2. The combination with a vehicle wheel and felly, of a housing hingedly connected thereto, a resonant member mounted within said housing, a hammer member springingly secured to said housing, a trip swivelly connected to said felly comprising an arm, one end of the arm being provided with a lateral extension to releasably engage said hammer, and a shoe formed on the other end of said arm for a purpose specified.

3. The combination with a felly of a vehicle wheel, of a housing comprising a rectangular casing having the bottom thereof removed, one end of said housing being hingedly secured to said felly, an enlargement formed on the opposite end of said housing, a spring trip mounted on said felly adapted to detachably engage said enlargement, a gong mounted within said housing, a hammer arm mounted within the housing, and a trip swivelly connected to said felly adapted to at times engage said hammer for a purpose specified.

4. The combination with a felly of a vehicle wheel, of a housing hingedly secured to said felly, a gong mounted within the housing, a pair of projections extending from one end of the housing in spaced relation, a spring shield member secured between said projections, a ball member having a transversely extending opening therein to receive the spring member, said spring member extending through the ball, and means associated with the felly to releasably engage said spring member for a purpose specified.

In testimony whereof we affix our signatures hereto.

FRANK FRAME.
LOUIS FRAME.

Copies of this patent may be obtained for five cents each, by addressing the "Commissioner of Patents, Washington, D. C."